US012572375B2

(12) United States Patent
Geiselbrecht et al.

(10) Patent No.: US 12,572,375 B2
(45) Date of Patent: Mar. 10, 2026

(54) OPERATING SYSTEM COMPATIBILITY LAYER

(71) Applicant: Google LLC, Mountain View, CA (US)

(72) Inventors: Travis Kirk Geiselbrecht, Bainbridge Island, WA (US); Nicholas J. Maniscalco, Seattle, WA (US)

(73) Assignee: Google LLC, Mountain View, CA (US)

( * ) Notice: Subject to any disclaimer, the term of this patent is extended or adjusted under 35 U.S.C. 154(b) by 468 days.

(21) Appl. No.: 17/876,174

(22) Filed: Jul. 28, 2022

(65) Prior Publication Data

US 2024/0036897 A1    Feb. 1, 2024

(51) Int. Cl.
| | |
|---|---|
| *G06F 9/455* | (2018.01) |
| *G06F 9/30* | (2018.01) |
| *G06F 9/38* | (2018.01) |
| *G06F 9/54* | (2006.01) |
| *G06F 21/53* | (2013.01) |

(52) U.S. Cl.
CPC ........ *G06F 9/45545* (2013.01); *G06F 9/3004* (2013.01); *G06F 9/3861* (2013.01); *G06F 9/544* (2013.01); *G06F 9/545* (2013.01); *G06F 21/53* (2013.01); *G06F 9/45558* (2013.01); *G06F 2009/45579* (2013.01); *G06F 2009/45583* (2013.01); *G06F 2009/45587* (2013.01)

(58) Field of Classification Search
None
See application file for complete search history.

(56) References Cited

U.S. PATENT DOCUMENTS

| | | | | |
|---|---|---|---|---|
| 10,033,759 | B1 * | 7/2018 | Kabra | ................... G06F 21/629 |
| 10,846,117 | B1 * | 11/2020 | Steinberg | ................ G06F 21/56 |
| 2010/0138831 | A1 * | 6/2010 | Inoue | .................. G06F 9/45558 |
| | | | | 718/1 |
| 2013/0227207 | A1 * | 8/2013 | Katz | ................... G06F 12/0246 |
| | | | | 711/103 |

(Continued)

OTHER PUBLICATIONS

Dawson, Joel , et al., "Phase Space Detection of Virtual Machine Cyber Events Through Hypervisor-Level System Call Analysis", Conference Paper • Apr. 2018, DOI: 10.1109/ICDIS.2018.00034, 10 pages.

(Continued)

*Primary Examiner* — Abu Zar Ghaffari
(74) *Attorney, Agent, or Firm* — Botos Churchill IP Law

(57) ABSTRACT

The technology provides efficient and secure virtualized execution of software compiled for a first (guest) operating system to run on a second (host) operating system. This includes delineating a kernel space and a separate user space, the kernel space including a handle table and kernel of a host operating system. In the user space, a restricted space is separate from an unrestricted space. The restricted space corresponds to a restricted mode and the unrestricted space corresponding to an unrestricted mode. A hyperprocess is implemented and a hyperprocess handle table is created in the unrestricted space. A set of child processes is loaded into separate memory address spaces in the restricted space, wherein the set of child processes is associated with a guest operating system. The hyperprocess handle table is shared among the child processes and includes a file descriptor tables each associated with a specific child process.

20 Claims, 10 Drawing Sheets

700

702 In an assigned address space, delineating a kernel space and a separate user space, the kernel space including a handle table and kernel of a host operating system 704 In the user space, delineating a restricted space separate from an unrestricted space, the restricted space corresponding to a restricted mode and the unrestricted space corresponding to an unrestricted mode 706 Implementing a hyperprocess and creating a hyperprocess handle table in the unrestricted space 708 Loading a set of child processes into separate memory address spaces in the restricted space, wherein the set of child processes are associated with a guest operating system 710 Wherein the hyperprocess handle table is shared among the set of child processes and includes a set of file descriptor tables, each file descriptor table being associated with a specific child process of the set of child processes

(56)                References Cited

U.S. PATENT DOCUMENTS

| | | | | |
|---|---|---|---|---|
| 2016/0092678 A1* | 3/2016 | Probert | ............... | G06F 21/6218 |
| | | | | 713/193 |
| 2016/0147556 A1* | 5/2016 | Hu | ...................... | G06F 9/45558 |
| | | | | 718/1 |
| 2018/0173548 A1* | 6/2018 | Schoenberg | ........ | G06F 9/45558 |
| 2021/0157489 A1* | 5/2021 | Tsirkin | .................. | G06F 3/0679 |
| 2022/0114009 A1* | 4/2022 | Ismael | .................. | G06F 9/5077 |
| 2022/0261366 A1* | 8/2022 | Drepper | .............. | G06F 12/1491 |
| 2023/0161650 A1* | 5/2023 | Li | ............................ | G06F 9/545 |
| | | | | 719/312 |

OTHER PUBLICATIONS

Onoue, Koichi , et al., "Control of System Calls from Outside of Virtual Machines", SAC'08 Mar. 16-20, 2008, Fortaleza, Cear'a, Brazil, pp. 2116-2121.

Phoh, Jonas , et al., "Nitro: Hardware-based System Call Tracing for Virtual Machines", Technische Universität München, Munich, Germany, 2011, 18 pages.

Blackberry QNX Neutrino, Realtime Operating System, 2017, 4 pages.

Comparing WSL 1 and WSL 2, Microsoft Docs, https://docs.microsoft.com/en-us/windows/wsl/compare-versions, retrieved from the internet on Jun. 9, 2022, 6 pages.

Starnix glossary, https://fuchsia.googlesource.com/fuchsia/+/refs/heads/main/src/proc/glossary.md, retrieved from the internet on Jun. 7, 2022, 5 pages.

Wikipedia, QNX, https://en.wikipedia.org/wiki/QNX, retrieved from the internet on Jun. 9, 2022, 8 pages.

Borisov, Bobby , "Windows Subsystem for Linux Explained, WSL & WSL2", https://linuxiac.com/windows-subsystem-for-linux-explained-wsl-wsl2/, retrieved from the internet on Jun. 9, 2022, 9 pages.

Geiselbrecht, Travis , et al., "Starnix state transitions, Or, How I Learned to Stop Worrying and Love Restricted Mode", 2021, 7 pages.

Maniscalco, Nick , "Multi-Aspace Processes", 2021, 8 pages.

Maniscalco, Nick , et al., "Starnix Runner faulting on Restricted Mode Addresses", 2021, 2 pages.

Maniscalco, Nick, et al., "Zircon Restricted Mode", 2021, 4 pages.

* cited by examiner

100

140

160

200

300

400

Kernel space

402

User Space

Figure 6A:
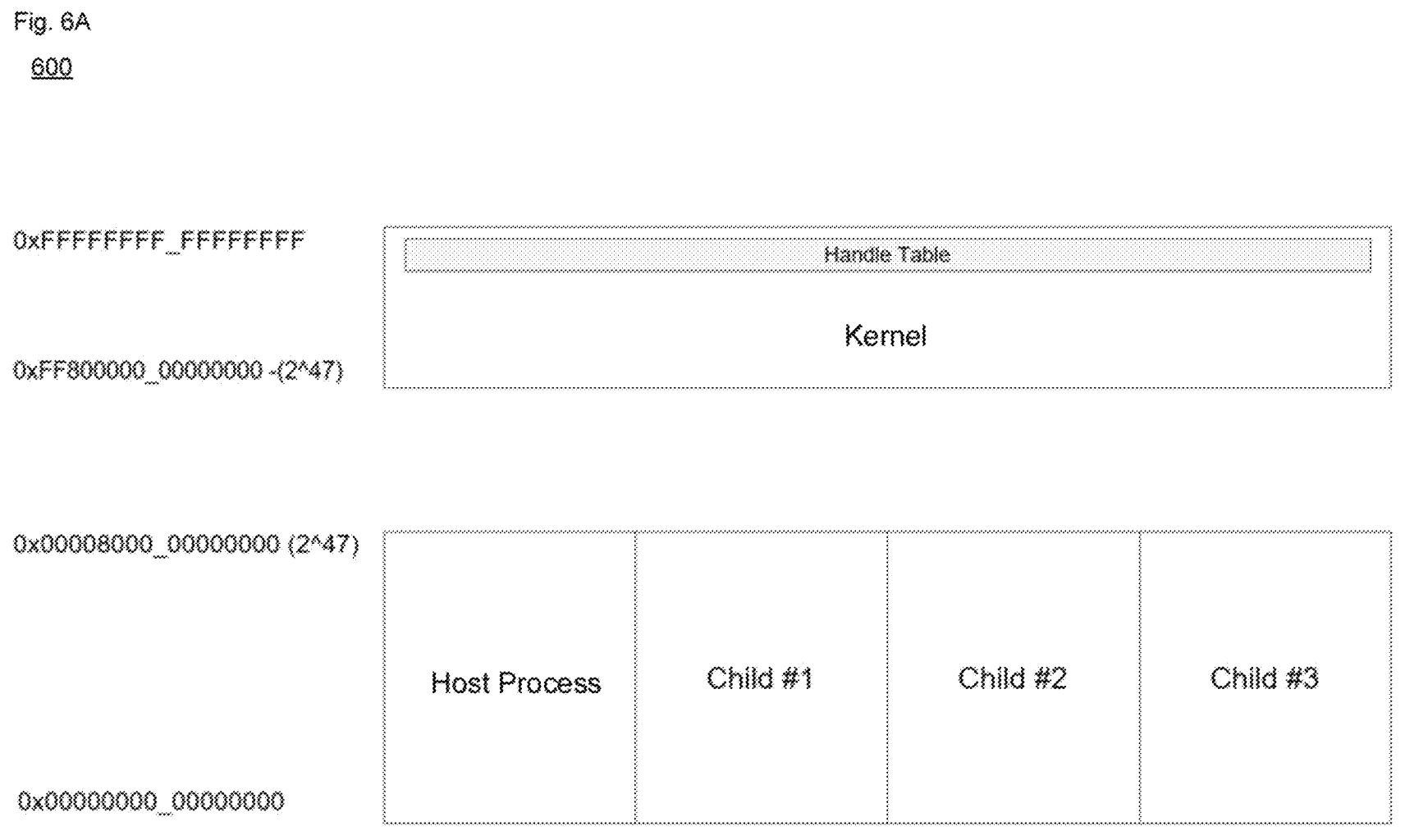

Handle Table

Kernel

Child #3

Child #2

Child #1

Host Process

0xFFFFFFFF_FFFFFFFF

0xFF800000_00000000 -(2^47)

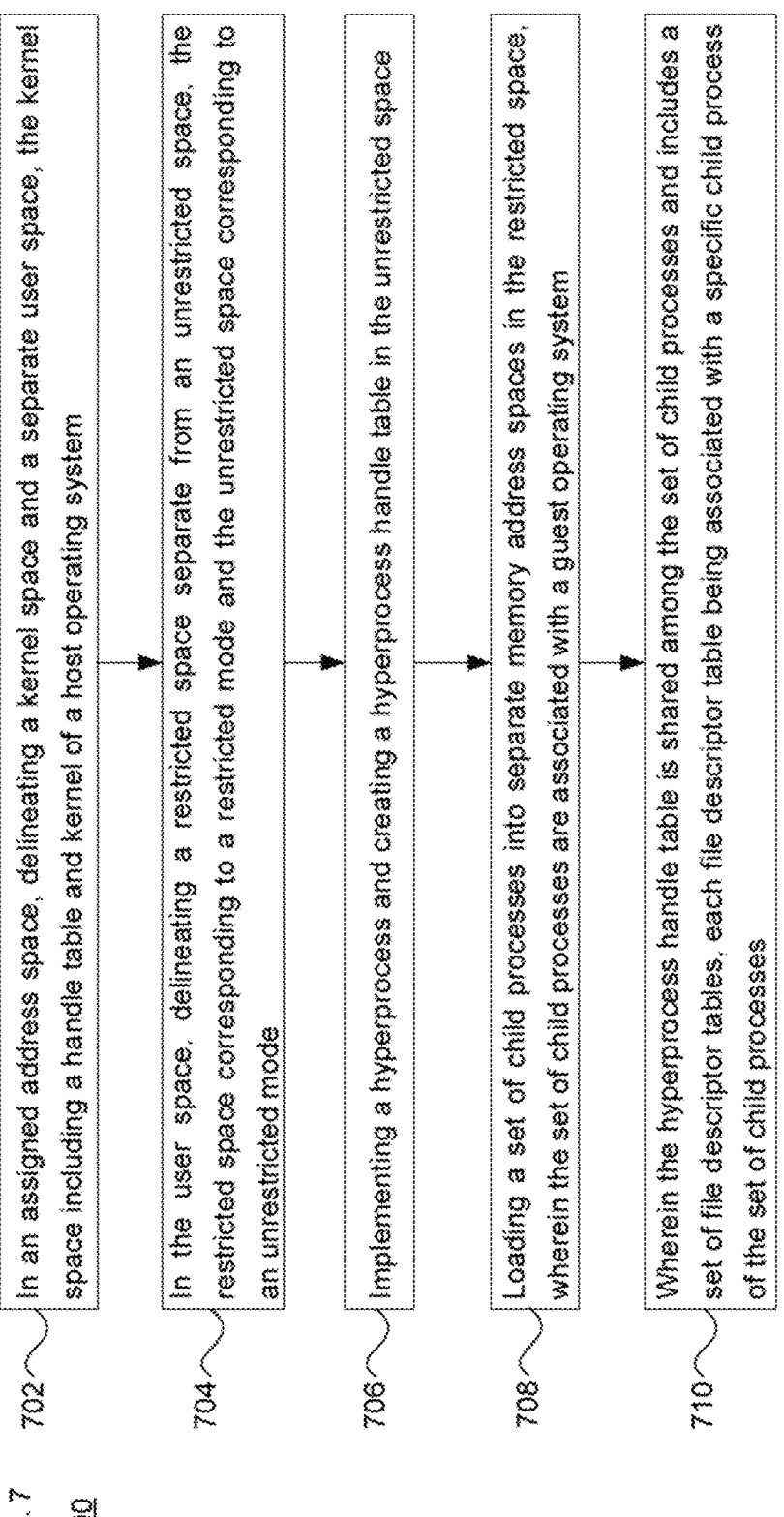

702 ~ In an assigned address space, delineating a kernel space and a separate user space, the kernel space including a handle table and kernel of a host operating system 704 ~ In the user space, delineating a restricted space separate from an unrestricted space, the restricted space corresponding to a restricted mode and the unrestricted space corresponding to an unrestricted mode 706 ~ Implementing a hyperprocess and creating a hyperprocess handle table in the unrestricted space 708 ~ Loading a set of child processes into separate memory address spaces in the restricted space, wherein the set of child processes are associated with a guest operating system 710 ~ Wherein the hyperprocess handle table is shared among the set of child processes and includes a set of file descriptor tables, each file descriptor table being associated with a specific child process of the set of child processes

OPERATING SYSTEM COMPATIBILITY LAYER

BACKGROUND

Computer systems, whether they be stand-alone devices such as desktop or laptop computers, or larger-scale systems such as cloud-based arrangements that employ one or more groups of servers, execute computer programs within an operating system environment. The operating system is designed to facilitate the execution of different programs and manage access to the hardware resources of the computer system. Virtualization may be employed to enable the execution of different computer program instances in different isolated virtual machines. However, there is often a large amount of overhead involved in two-level scheduling, which can be particularly cumbersome when running software created for a first operating system while actually using a second operating system. The overhead may cause delays when executing the software, or otherwise tie tip computing resources that could otherwise be utilized by the system. In addition, there may be security concerns when executing the software from one operating system on a different operating system.

BRIEF SUMMARY

Aspects of the technology make it possible to run software created for a first (guest) operating system in a second (host) operating system without the first operating system being directly involved. This can be accomplished using a hyperprocess as a compatibility layer that spans multiple other processes, and which has visibility and control over guest/child processes.

A typical operating system may employ two modes for execution of a given program: a user mode and a kernel mode. In user mode, processes to be run do not have direct access to certain hardware resources such as memory. The processes make system calls (syscalls) to underlying application programming interfaces (APIs) in order to access these hardware resources. In contrast, the kernel mode has direct access to the hardware resources. In this conventional approach, it may be difficult to manage mode switching between the user mode and kernel mode. For instance, in conventional approaches virtual machines (VMs) can have significant overhead. A given VM may have a virtual CPU and schedule each process, while the host machine schedules processes for the whole CPU. This two-level scheduler has a lot of overhead that can consume or otherwise tie up system processing and memory resources. In contrast, the present technology uses another layer of abstraction, the hyperprocess, in between the real kernel and the user space. The address space is remapped to accommodate this, providing both a shared user space and a restricted user space. This approach can overcome difficulties associated with the two-level scheduler and memory disadvantages exhibited by conventional virtualization techniques.

According to the technology, the user mode is segregated into restricted and not restricted (or shared) modes. This allows a compatibility layer of the host operating system to run the code (binaries) for the guest operating system without modification, in particular by enabling a given runtime binary to be mapped in the same manner across a set of processes. This approach effectively emulates multiple privilege levels within the user space with fast mode switching between such levels. In addition, the emulated kernel always has access to its associated memory, and the host operating system task schedule is leveraged to provide a direct (1:1) mapping between an emulated task and the counterpart task in the second (hosting) operating system.

According to one aspect, a computer-implemented method is executable by one or more processors of a processing system. The method comprises: in an assigned address space, delineating a kernel space and a separate user space, the kernel space including a handle table and kernel of a host operating system; in the user space, delineating a restricted space separate from an unrestricted space, the restricted space corresponding to a restricted mode and the unrestricted space corresponding to an unrestricted mode; implementing a hyperprocess and creating a hyperprocess handle table in the unrestricted space: and loading a set of child processes into separate memory address spaces in the restricted space, wherein the set of child processes are associated with a guest operating system. The hyperprocess handle table is shared among the set of child processes and includes a set of file descriptor tables, each file descriptor table being associated with a specific child process of the set of child processes.

The implementing may be performed by a runner of the host operating system. The method may further comprise loading a host process into the restricted space in a location distinct from the memory address spaces of the child processes. Alternatively or additionally, delineating the restricted space separate from the unrestricted space includes splitting the user space into two partitions. Here, the two partitions may evenly split the user space, or the two partitions may be split along a page table boundary.

Alternatively or additionally to any of the above, the set of child processes may have an N:1 mapping with hyperprocess handle table, and each thread of a given child process has an N:1 mapping with the given child process, and an N:1 mapping with the memory address spaces in the restricted space. Alternatively or additionally, the memory address spaces in the restricted space may have a tree of virtual memory access regions associated with the set of child processes. Alternatively or additionally, upon entering the restricted mode via a system call, the method includes returning any traps and exceptions back to the unrestricted mode via an in-process vector table. Alternatively or additionally, the method may further comprise the kernel saving restricted state information upon transitioning to the unrestricted mode.

A thread of a given child of the set of child processes may be permitted to access different memory regions depending on which process it is a member of, and which mode it is operating in. Alternatively or additionally to any of the above, implementing the hyperprocess and creating the hyperprocess handle table in the unrestricted space may include implementing a set of distinct hyperprocesses each having its own hyperprocess handle table, in which the set of child processes for a given one of the set of hyperprocesses does not interact with the set of child processes for any other of the set of hyperprocesses.

According to another aspect, a processing system is provided which comprises: memory having a set of address spaces, and one or more processors operatively coupled to the memory. The one or more processors are configured to: in an assigned address space, delineate a kernel space and a separate user space, the kernel space including a handle table and kernel of a host operating system; in the user space, delineate a restricted space separate from an unrestricted space, the restricted space corresponding to a restricted mode and the unrestricted space corresponding to an unrestricted mode; implement a hyperprocess and create a hyperprocess handle table in the unrestricted space; and load a set of child processes into separate memory address spaces in the restricted space, wherein the set of child processes are associated with a guest operating system; wherein the hyperprocess handle table is shared among the set of child processes and includes a set of file descriptor tables, each file descriptor table being associated with a specific child process of the set of child processes.

The processing system may be configured to load a host process into the restricted space in a location distinct from the memory address spaces of the child processes. Delineation of the restricted space separate from the unrestricted space may include splitting the user space into two partitions. The set of child processes may have an N:1 mapping with hyperprocess handle table, and each thread of a given child process may have an N:1 mapping with the given child process, and an N:1 mapping with the memory address spaces in the restricted space.

The memory address spaces in the restricted space may have a tree of virtual memory access regions associated with the set of child processes. Upon entering the restricted mode via a system call, the processing system may support the returns of any traps and exceptions back to the unrestricted mode via an in-process vector table. A thread of a given child of the set of child processes may be permitted to access different memory regions depending on which process it is a member of, and which mode it is operating in. Implementation of the hyperprocess and creation of the hyperprocess handle table in the unrestricted space may include implementing a set of distinct hyperprocesses each having its own hyperprocess handle table, in which the set of child processes for a given one of the set of hyperprocesses does not interact with the set of child processes for any other of the set of hyperprocesses.

BRIEF DESCRIPTION OF THE DRAWINGS

FIGS. 6A-B illustrate address space examples in accordance with aspects of the technology.

FIG. 7 illustrates a method in accordance with aspects of the technology.

DETAILED DESCRIPTION

Overview

Aspects of the technology provide efficient and secure virtualized execution of software compiled for a first (guest) operating system to run on a second (host) operating system. The software does not run directly on the host operating system, and may be configured for an initial memory layout and system call semantics that match the guest operating system rather than the host operating system. Instead, the host operating system is configured to provide a runtime environment that the guest software expects. This can be achieved using a restricted mode in combination with shared memory features.

This approach enables the computing device to run unmodified applications for the guest operating system running in the virtual machine via the host operating system. The approach maintains the security of the operating system while avoiding memory and processing burdens that can occur with a two-level scheduler. The computing device may be a desktop computer, a laptop computer such as a netbook, an interactive home appliance, a wearable (e.g., a smartwatch or wireless earbuds) or even a networked computing platform. Several types of exemplary computing devices are discussed below, followed by a discussion of the general operating system architecture.

Example Computing Devices

Figure 1A:
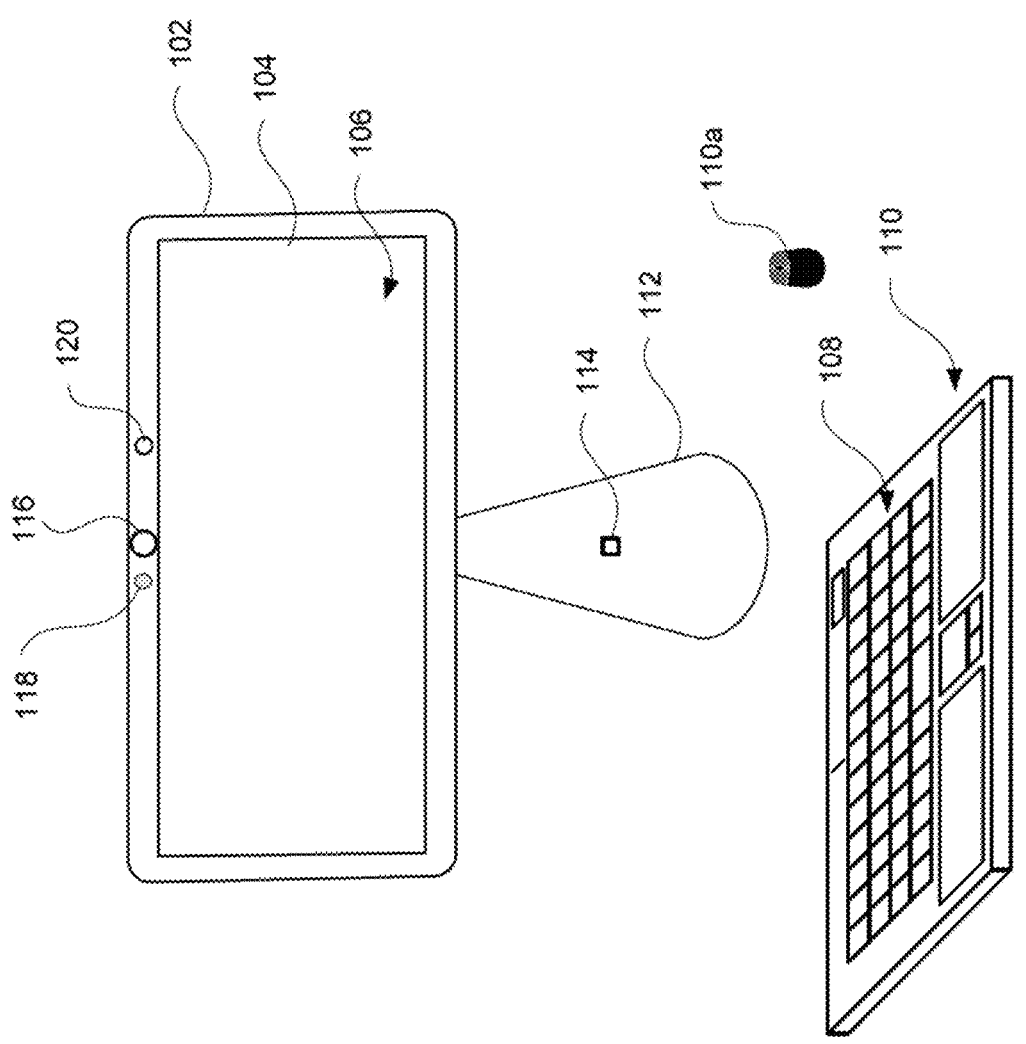
FIGS. 1A-C illustrates example computing devices which can be employed in accordance with aspects of the technology.

FIG. 1A illustrates a view 100 of an example desktop-type computing device 102. In this example, a single display 104 is shown, although multiple display devices may be supported. In one scenario, the display 104 may be configured for tactile input using a stylus or touch input with the user's finger(s) to interact with a graphical user interface (GUI) 106 presented on the display. As shown, the computing device 102 may employ a wireless keyboard 108 and/or one or more trackpads or mousepads 110, which may be part of one unit or the keyboard may be separate from the trackpad/mousepad or a mouse-based input 110a. Alternatively, the keyboard and/or other user inputs may have a wired connection to the computing device 102. As shown in this example, the computing device has a stand 112. One or more microphones 114 may be disposed along the stand and/or disposed along the housing of the integrated client device 102. While the computing device may be fixedly mounted to the stand 112, in an alternative configuration the screen (with the integrated components) can be detached from the stand, allowing a user to carry around the home and use remotely based on battery power. In other words, the client device can comprise an integrated housing that is (optionally removably or releasably) coupled to the stand 112.

In this example, a webcam or other integrated camera 116 that may include a privacy shutter or other feature to disable image-taking is positioned along the housing of the computing device 102, which can be used for videoconferences, interactive gaming, etc. Indicator 118, such as an LED, may be illuminated to alert a user whenever the webcam 116 is in use. The integrated client device may include a separate camera or other imaging device 120 that is part of a presence sensor. As shown, the webcam 116 and the imaging device 120 may each be positioned along a top bezel of the integrated client device housing. In some examples, these devices may be located in different position along the integrated housing. The integrated camera 116 may be used as part of the presence sensor instead of or in addition to imaging device 120. In other words, the presence sensor comprises an image sensor configured to take one or more images. The presence sensor can be configured to detect presence of one or more people within a threshold distance from the client computing device. For example, the presence sensor includes the image sensor, as discussed herein, and the client device is configured to detect the presence of one or more people in imagery (images) taken by the image sensor.

Figure 1B:
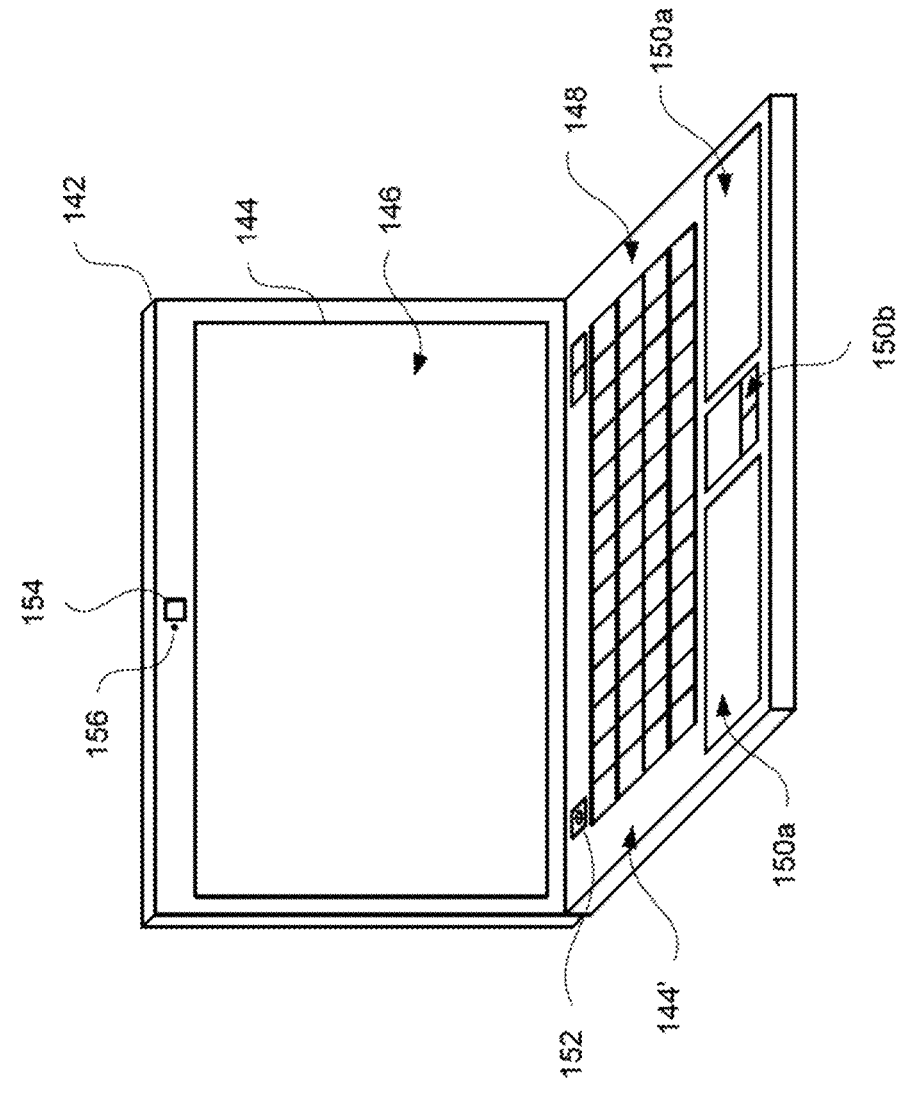

FIG. 1B illustrates view 140 of an example laptop computer 142, such as a netbook. In this example, a display 144 is shown. In one scenario, the display 144 may be configured for tactile input using a stylus or touch input with the user's finger(s) to interact with a graphical user interface (GUI)

146 presented on the display. As shown, the laptop 142 may employ a keyboard 148 and/or one or more trackpads 150*a* and/or mousepads 150*b*. These input devices 148 and 150 may be virtual input devices presented on a second display 144'. In this case, the laptop computer 142 may also function as a dual-screen device. One or more microphones 152 may be disposed along the housing of the computer 142. The laptop computer 142 may include a webcam or other integrated camera 154 that may include a privacy shutter or other feature to disable image-taking is positioned along the housing, which can be used for videoconferences, interactive gaming, etc. Indicator 156, such as an LED, may be illuminated to alert a user whenever the webcam 154 is in use. Similar to the computing device 102, the laptop computer 142 may include a separate camera or other imaging device, other than the webcam 154, that is pan of a presence sensor.

Figure 1C:
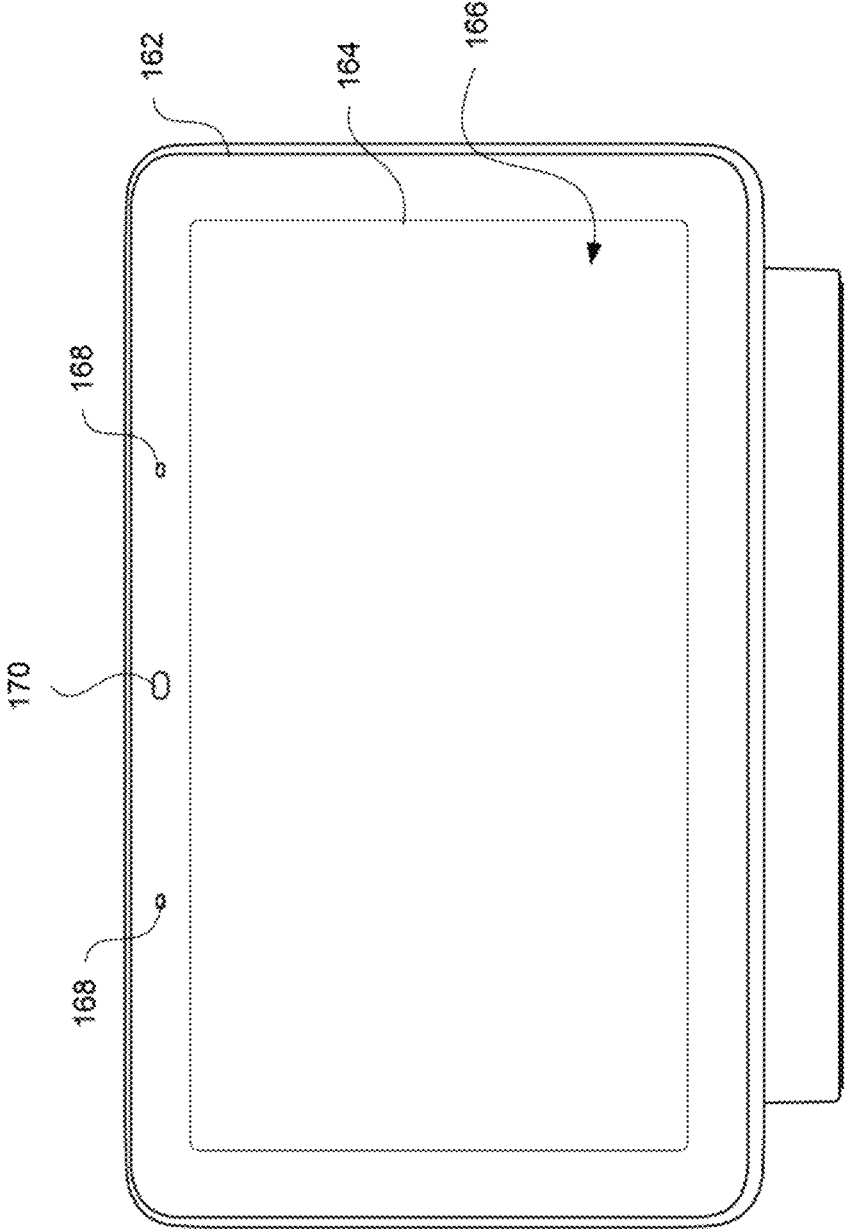

FIG. 1C illustrates view 160 of an example interactive home appliance 162. In this example, a display 164 is shown. In this example, the appliance 162 does not include a keyboard. In one scenario, the display 164 may be configured for tactile input using a stylus or touch input with the user's finger(s) to interact with a graphical user interface (GUI) 146 presented on the display. Alternatively or additionally to this, the interactive home appliance 162 may be configured to detect contactless gesture input, such as using a close range radar sensor (not shown), acoustical sensors (e.g., a microphone army) 168, cameras such as webcam 170, etc. In this arrangement, the camera(s) 170 may be part of a presence sensor.

Figure 2:
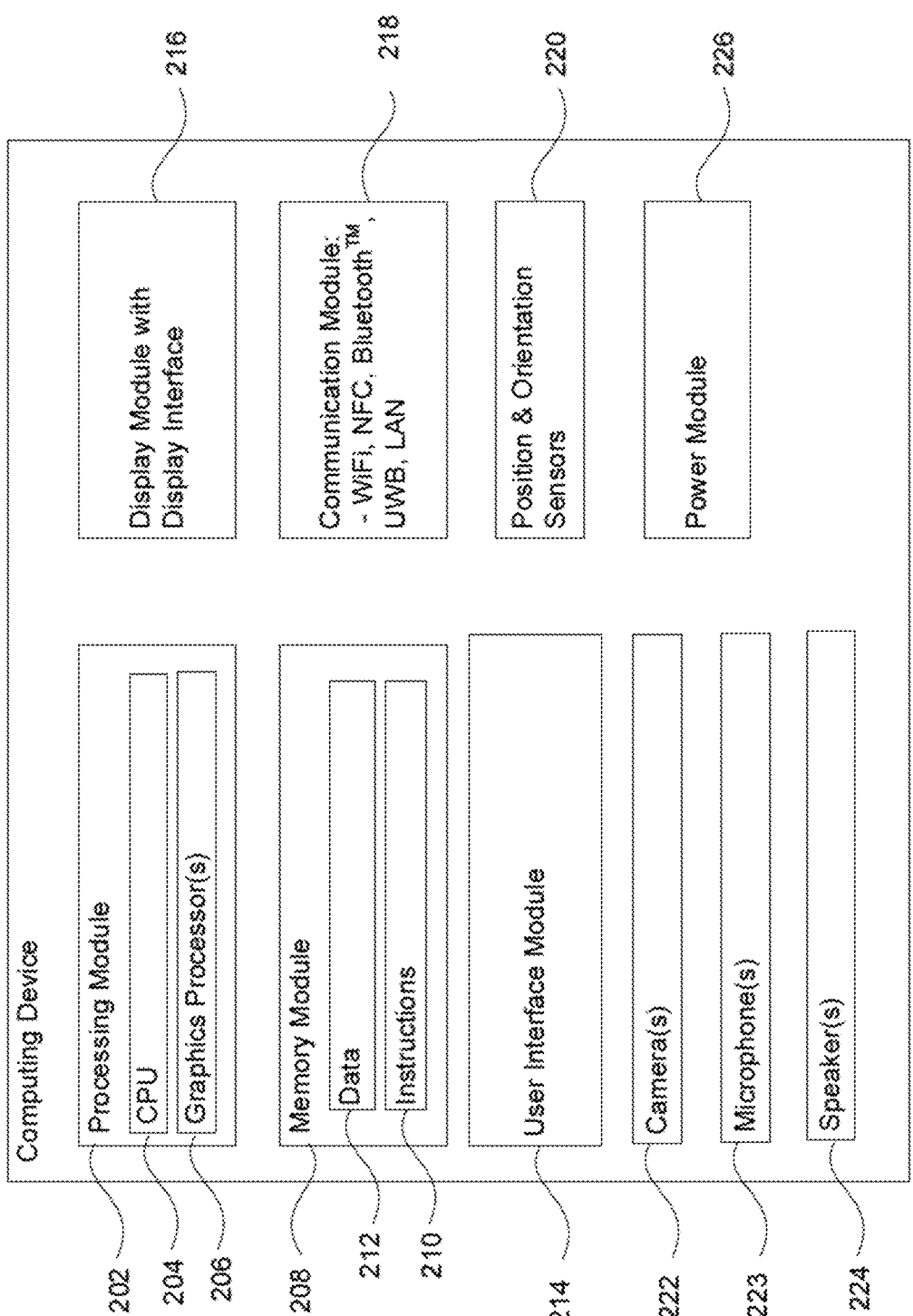
FIG. 2 illustrates a block diagram of an example computing device which can be employed in accordance with aspects of the technology.

FIG. 2 illustrates a block diagram 200 of an example computing device such as a desktop-type device, laptop-type device or interactive home appliance-type device discussed above. Depending on the type of device, certain elements such as various user interface components may be optional or omitted. As shown, the computing device includes a processing module 202 having one or more computer processors such as a central processing unit 204 and/or graphics processors 206, as well as memory module 208 configured to store instructions 210 and data 212. The processors may or may not operate in parallel, and may include ASICs, controllers and other types of hardware circuitry. The processors are configured to receive information from a user through user interface module 214, and to present information to the user on a display device of the display module 216 via the user interface module. The display module 216 has a display interface and may be configured as a touchscreen that enables user input via a stylus or other tool, or by the user physically touching the screen. Alternatively or additionally, contactless gesture input and/or audio input may be supported.

User interface module 214 is configured to receive user input. User interface module 214 may receive commands from a user via user inputs and convert them for submission to a given processor. The user interface module may link to a web browser (not shown). The user inputs may include a touchscreen as noted above, in addition to or alternatively from a keyboard, keypad, mousepad and/or touchpad, microphone, gesture-based input or other types of input devices. The keyboard, keypad, mousepad and/or touchpad may be part of or connectable to the computing device via a cable or other wired connection, or may physically separate from the integrated client device and configured to connect via one or more wireless connections such as Bluetooth™, WiFi, ultra-wideband (UWB), infrared, etc. The user interface module 214 can be operatively connected to the display module 216.

The display module 216 may comprise circuitry for driving the display device to present graphical and other information to the user. In other words, the display device is configured to present visual content. By way of example, the graphical information may be generated by the graphics processor(s) 206, while central processing unit (CPU) 204 manages overall operation of the computing device. The graphical information may display responses to user queries on the display module 216. For instance, the processing module may run a browser application, gaming application, enterprise app or other service using instructions and data stored in memory module 208, and present information associated with such apps or services to the user via the display module 216. The memory module 208 may include a database or other storage for browser information, game state information, location information, etc.

Memory module 208 can be implemented as one or more of a computer-readable medium or media, a volatile memory unit or units, or a non-volatile memory unit or units. The memory module 208 may include, for example, flash memory and/or NVRAM, and may be embodied as a hard-drive or memory card. Alternatively, the memory module 208 may also include removable media (e.g., DVD. CD-ROM or USB thumb drive). One or more regions of the memory module 208 may be write-capable while other regions may comprise read-only (or otherwise write-protected) memories. In one implementation, a computer program product is tangibly embodied in an information carrier. Although FIG. 2 functionally illustrates the processor(s), memory module, and other elements of integrated client device as being within the same overall block, such components may or may not be stored within the same physical housing. For example, some or all of the instructions and data may be stored on an information carrier that is a removable storage medium connectable to the base or the display housing (e.g., optical drive, high-density tape drive or USB drive) and others stored within a read-only computer chip which is integrated into the base or the display housing.

The data 212 may be retrieved, stored or modified by the processors in accordance with the instructions 210. For instance, the data may be stored in computing device registers, in a relational database as a table having a plurality of different fields and records. XML documents or flat files. The data may also be formatted in any computing device-readable format. The instructions 210 may be any set of instructions to be executed directly (such as machine code) or indirectly (such as scripts) by the processor(s). For example, the instructions may be stored as computing device code on the computing device-readable medium. In that regard, the terms "instructions" and "programs" may be used interchangeably herein. The instructions may be stored in object code format for direct processing by the processor(s), or in any other computing device language including scripts or collections of independent source code modules that are interpreted on demand or compiled in advance.

As also shown in example 200 of FIG. 2, the computing device includes a communication module 218 for communicating with other devices and systems, including other computing devices (e.g., a user's mobile phone or wearable computing device such as a smartwatch or pair of earbuds), servers and databases. The communication module 218 includes a wireless transceiver; alternatively, the module may alternatively or additionally include a wired transceiver. The integrated client device 200 may communicate with other remote devices via the communication module 218 using various configurations and protocols, including short range communication protocols such as near-field communication (NFC), Bluetooth™, Bluetooth™ Low Energy (BLE), UWB or other ad-hoc networks, the Internet, intranets, virtual private networks, wide area networks, local networks, private networks using communication protocols proprietary to one or more companies, Ethernet, WiFi and HTTP, and combinations of the foregoing.

In addition, the example computing device as shown may include one or more position and orientation sensors 220. The position and orientation sensors 220 are configured to determine the position and orientation of one or more parts of the computing device, such as the display module relative to the base. For example, these components may include a GPS receiver to estimate the integrated client device's latitude, longitude and/or altitude, as well as an accelerometer, gyroscope or another direction/speed detection device such as an inertial measurement unit (IMU) capable of determining the orientation of the display housing relative to the base (as well as the rate of change of the positioning of the display housing). The computing device may also include one or more camera(s) 222 for capturing still images and recording video streams such as an integrated webcam and/or a dedicated imaging device for presence sensing as discussed above. The device may also include one or more microphones 223 (which can be used for instruction input and/or presence sensing, e.g., by detecting acoustic information within the threshold distance from the client device), speakers 224, as well as a power module 226. Actuators to provide tactile feedback or other information to the user may be incorporated into the touchscreen of the display module (not shown).

Figure 3:
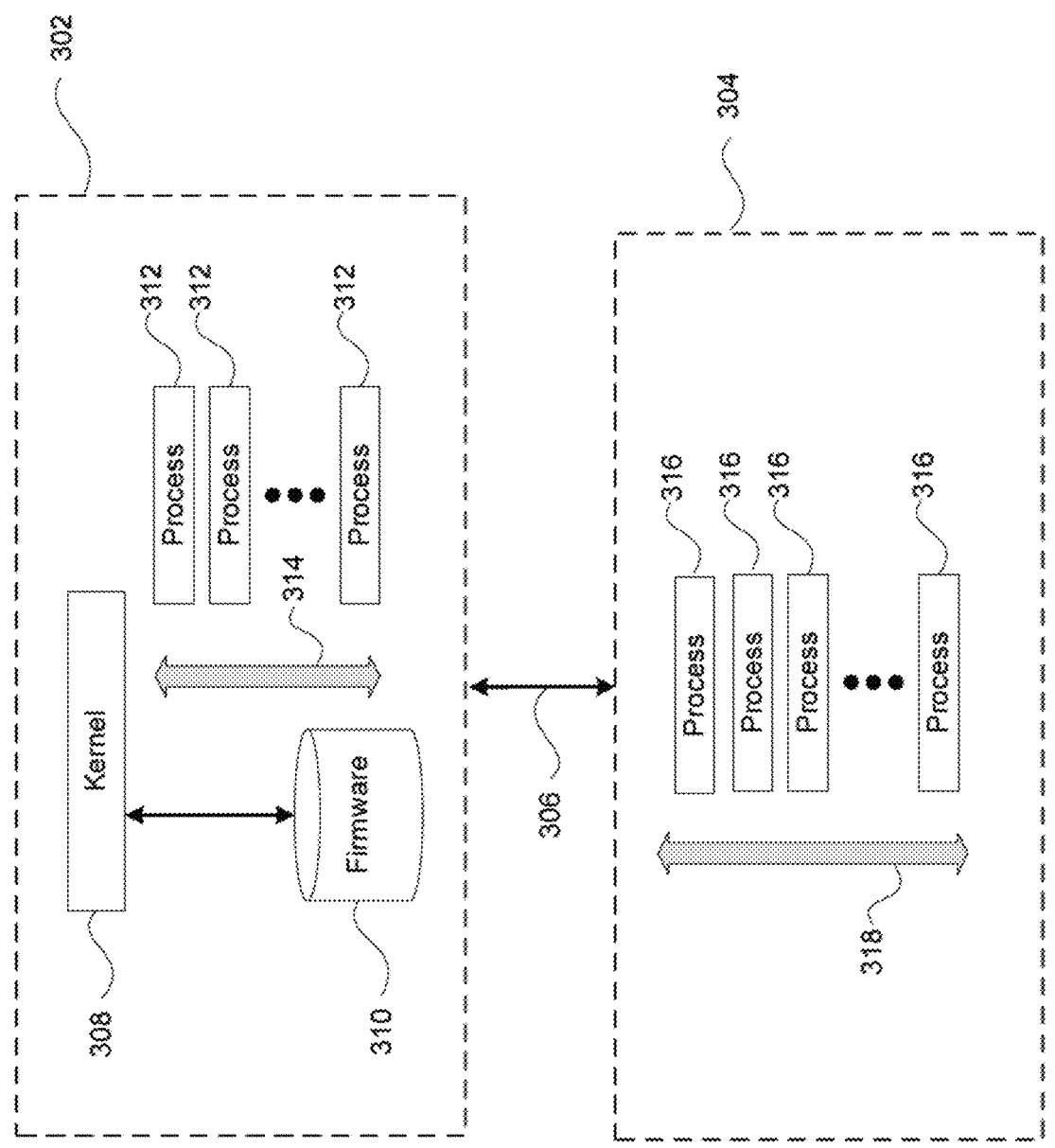
FIG. 3 illustrates a functional diagram of host and guest operating systems in accordance with aspects of the technology.

FIG. 3 illustrates an example 300 of a functional arrangement for a computing device that supports virtualization. As shown, a host operating system 302 is able to interact with a guest operating system 304 with interactions shown via arrow 306. The host operating system 302 may logically include, as shown, a kernel 308, firmware 310 and one or more routines or other processes 312. The kernel 308 may communicate with the routines or other processes via a system bus 314, such as a d-bus, for inter-process communication (IPC). This typically occurs through system calls (syscalls). Here, the process calls into the kernel, and either gets an immediate response, or waits until the kernel responds to them, both of which occur by returning from the syscall. The guest operating system 304 may logically include, as shown, one or more routines or other processes 316 that are passed to the kernel 308 link 318. By way of example, the processes may include user-facing applications, device drivers, file systems, media codecs, network stacks, etc.

Example Arrangements
General Host Operating System and Kernel Architecture

In certain types of computing systems that employ virtualization, a virtual CPU (vCPU), also known as a virtual processor, is a physical central processing unit (CPU) that is assigned to a virtual machine (VM). According to aspects of the technology, the host operating system is capable of running unmodified apps, programs or other software (which may be referred to herein as binaries) for a guest operating system, such as Linux, via a specialized microkernel architecture (e.g., including a kernel such as kernel 308), which is a type of kernel that includes only a minimum amount of code needed to function at the kernel mode.

In contrast to a typical monolithic kernel, a microkernel differs in how it moves most components out of the kernel and places those components into user mode and a user space. Code running in the user space has limited operating system access and has limited direct interaction with the host kernel, which provides enhanced security. For example, the host kernel may only handle vital kernel functions like IPC and scheduling at the kernel mode, whereas other functions are moved to the user space while in user mode. In comparison, a monolithic kernel would typically have nearly every function, regardless of its level of importance, at the kernel mode and few or none in the user mode.

In one aspect, the system is configured to provide an environment for running precompiled guest binaries on the host operating system without modification. This can be done using ARM-type hardware architectures as well as x86-type and RISC-type hardware architectures. The host operating system environment can employ a runner to run the guest binaries. The runner is a program that loads another program and builds a process to run the other program. For instance, the runner invokes a hyperprocess, which may clone at least part of itself into the unrestricted region of the user space. The hyperprocess functions as a translation layer in user space, which avoid having the host operating system kernel directly interact with processes of a guest operating system. Invoking the hyperprocess involves creating a hyperprocess handle table. Child binaries (e.g., executable code from a guest operating system) are loaded into the restricted region of the user space. Each child binary is separate from other child binaries, and each has its own address space in the restricted region. The hyperprocess handle table in the restricted region is a shared handle table, which shares futex domains and other features to support shared processes. This approach is discussed further below.

Figure 4:
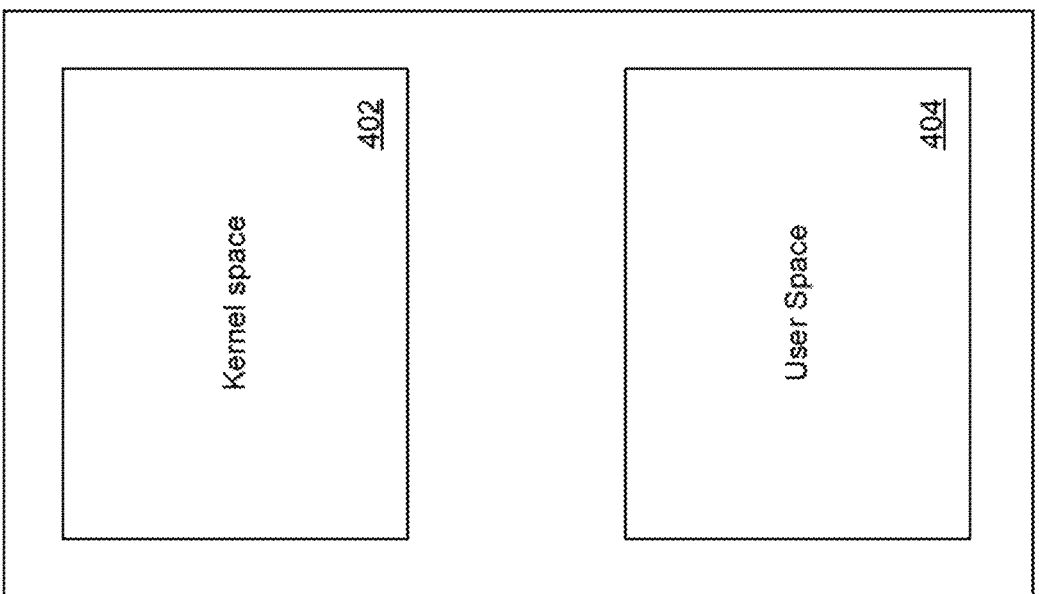
FIG. 4 illustrates an example of virtual address space for use with aspects of the technology.

The kernel architecture is configured to provide syscalls to manage processes, threads, virtual memory, inter-process communication, waiting on object state changes, and locking (via futexes). Futexes are objects that enable a caller to wait for a condition to occur at a given memory address. In such aspects, the kernel architecture includes a microkernel, a set of user space drivers, services, and libraries required for the system to communicate with hardware, boot, load user space processes. FIG. 4 illustrates an example of virtual address space 400, showing that kernel space 402 is distinct from user space 404.

The microkernel architecture may be configured to enable the host operating system to reduce the amount of trusted code running in the system to a few core functions, such as memory management, scheduling and inter-process communication. Guest code in the user space is able to interact with objects in kernel space using syscalls. Processes in the user space can access syscalls through a virtual Dynamic Shared Object (VDSO), which the kernel maps into the address space of each new process. The VDSO is an Executable and Linkable Format (ELF) file containing the user-space implementation of each syscall. ELF is a preexisting file format for executable files, object code, shared libraries, and core dumps. Most system calls operate directly with one or more handles, which are process-local references to objects in kernel space represented as integers. Each handle declares the privileges (rights) that the holder has to perform actions on the handle itself or the referenced object. A handle in user space may be represented as an integer (e.g., a 32-bit integer). Here, when syscalls are executed, the kernel can check that a handle parameter (if used) references a handle that exists within the calling process's handle table. The kernel can also check to ensure that the handle is of a correct type, and that the required rights for the requested operation are associated with the handle.

The kernel can expose different kernel objects for running code, including (1) threads of execution within a given address space, (2) processes that are a set of executable instructions run in a private, isolated address space, and (3) jobs that can include a group of related processes. Because processes may be isolated by default in this architecture, the kernel can provide a way for the processes to securely communicate with one another. The following kernel object types may be employed for inter-process communication (IPC): events, sockets, streams, channels, and first-in, first-out (FIFO). An event is a signaling interface between two processes. A socket is a streaming data transport. A stream is another type of streaming data transport that is seekable. A channel is a message-based transport configured to pass both data and a set of handles, and are able to launch new processes by transferring handles to another process. And a FIFO is a control plane for shared memory access.

A kernel process is a set of instructions that will be executed by one or more threads, along with a collection of resources associated with the thread(s). A process object is a container of different resources, such as handles, threads and virtual memory access regions (VMARs). Processes are owned by jobs, which enables an application that is composed of multiple processes to be treated as a single item from the perspective of resource and permission limits, as well as end-to-end control of the processes.

Restricted Mode

As used herein, a "normal" (unrestricted) mode provides an execution mode for a thread that receives syscalls from when the thread is executing in restricted mode. When running in normal mode, the thread is able to execute code from the runner, has read/write access to a defined address space, and can interact directly with handles. The defined address space is a range of memory addresses that have a consistent mapping to physical memory across child processes. These shared mappings enable the runner to implement syscalls from child processes using data structures that are shared between child processes. In contrast. "restricted" mode is an execution mode for a thread that causes syscalls issued by the thread to be routed to the normal mode rather than handled by the host operating system kernel itself. Therefore, when running in restricted mode, the thread is able to execute code from the guest operating system binary, but has no access to the defined address space and also cannot interact directly with handles or with threads of other child processes managed by the same hyperprocess. This helps preserve security between guest app execution and host processes.

A running thread may typically exist in one of two modes: user mode or kernel mode. When a user thread makes a syscall, it transitions (such as via a mode switch) from user mode up to kernel mode. Upon completing the syscall, it transitions back down to user mode. The present technology introduces an optional mode associated with the user mode, which is the restricted mode. This approach supports a "user space kernel" in between the host kernel and the user space. The address space is remapped to accommodate the user space kernel. This removes two-level scheduler and memory disadvantages that may otherwise exist in other approaches.

In restricted mode, when called the syscall would replace the calling thread's user mode mappings with those defined by a restricted space mapping (e.g., "restricted_aspace") and replace the user mode registers with those specified by restricted registers (e.g., "restricted_regs)" and return. Returns may occur via an exception or interrupt vector style dispatch. In this example, restricted_aspace is a handle to an address space (a new kernel object similar to VMAR), and restricted_regs is a data structure containing general purpose registers. Control would then proceed from a point defined by restricted_regs.

From the kernel's perspective, the syscall returns immediately after changing the mappings and setting the registers. However, from the calling program's perspective, the syscall will appear to block until the thread leaves restricted mode. From a kernel scheduling perspective, there would still be only one thread here.

A thread may leave restricted mode in all of the typical ways a thread might leave user mode, such as via a syscall, fault, interrupt, etc. When a thread leaves restricted mode, it may return to kernel mode or to user mode depending on what caused it to leave restricted mode. For example, interrupts and non-fatal page faults may be serviced by kernel mode, while fatal page faults and syscalls may cause the thread to return to user mode (such as to cause a mode switch to return). Upon returning to user mode, restricted_regs will contain the register state just prior to the return. In this way the user mode can handle the restricted mode's fatal page fault or syscall by manipulating the returned registers and contents of restricted_aspace, which may also be mapped into user mode.

The kernel thread structure can include a field that indicates whether the thread is operating in user or restricted mode. When entering the kernel via syscall, the kernel would check to see if the thread was running in a restricted mode. If so, the kernel is able to change the mappings and restores the registers that were saved when the user thread last called for the mode switch, and return to user mode. When entering the kernel via page fault, the page fault handler can either satisfy page fault or switch and return, leaving it up to user mode to address.

Managing this approach is a kernel process that can support one kernel thread for every guest or child thread that it hosts (a "hyperprocess"). However, the hyperprocess can host one or more guest/child processes—in other words it can be shared across multiple guest/child processes. The hyperprocess may also support threads without any restricted mode components. In one example, each syscall from a guest/child process can be implemented as an invalid syscall host exception. In this case, since the syscall instruction does not originate from the VDSO, an existing host exception mechanism will trap it and a host supervisor process catches the exception on the thread for handling. Multiple hyperprocesses may run independently in the system, each with its own set of guest/child processes. Thus, in some situations, there may be two or more separate hyperprocesses running concurrently (which may correspond to independent copies of one or more guest operating systems), in which the guest/child process(es) in each hyperprocess do not interact with the guest/child processes of any other hyperprocess.

Address Space

One aspect of the technology enables host processes to share a portion of their address space with other host processes while keeping a different portion of their address space private. Threads that a host runner processes will be in either restricted mode or normal mode. When in restricted mode, the thread will only be able to access the private portion of the address space. When in normal mode, the thread will be able to access both the shared and private portions.

Figure 5:
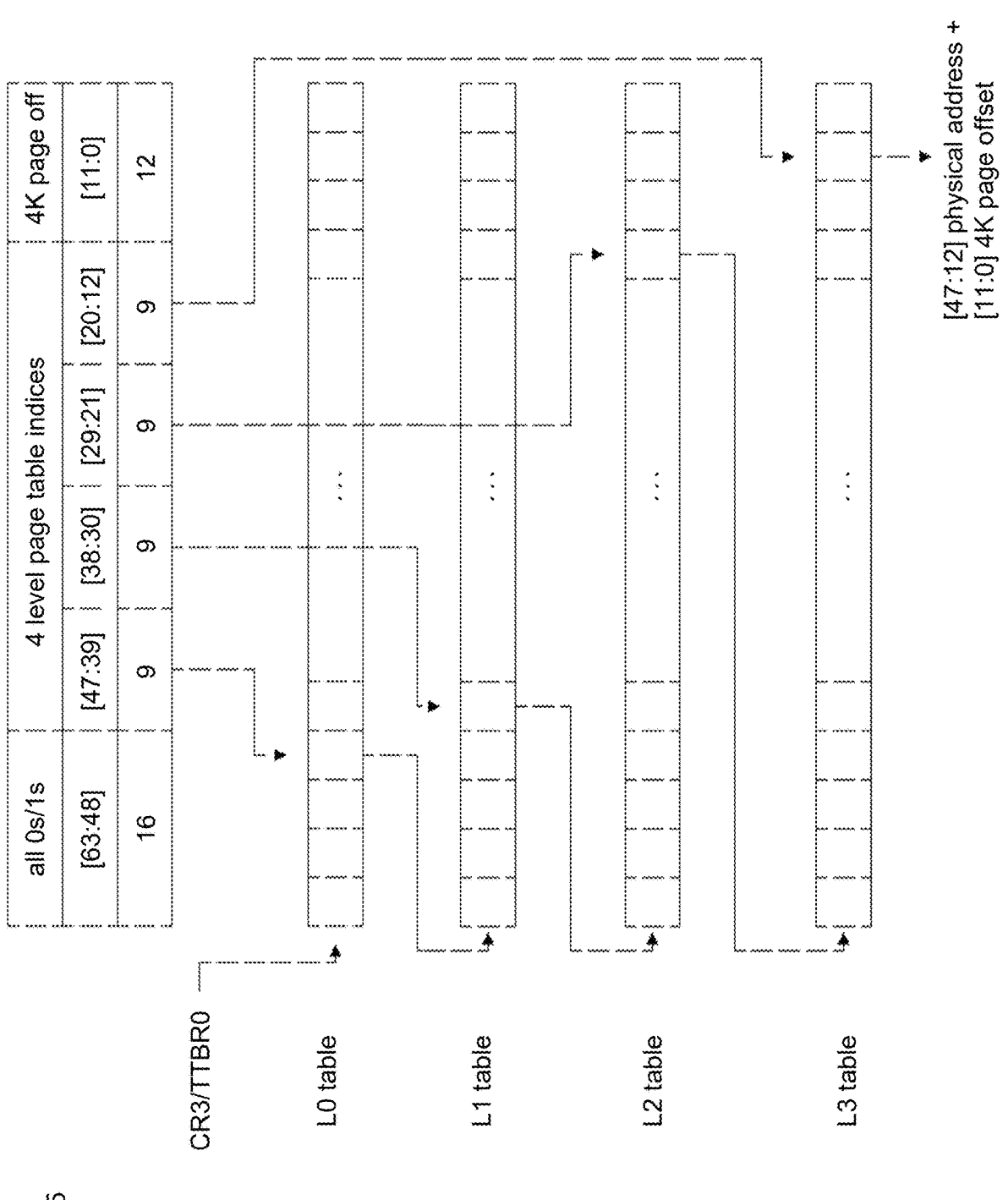
FIG. 5 illustrates an address mapping example in accordance with aspects of the technology.

The host system is configured to set up its environment and manage the page tables of guest applications it runs. When sharing the hyperprocess across multiple guest processes, the system may share a specific portion of the address space, a handle table, and futexes. FIG. 5 illustrates a general example 500 of mapping a hyperprocess into multiple address spaces, illustrating L0, L1, L2 and L3 page tables. This example is for a 64-bit ARM page table. For instance, the input 64-bit address can be broken into 6 fields which feed the page tables. Each page table in this example is 4K in size with 512 8-byte entries. Page tables live entirely in physical address space, so internal pointers are physical. Each level of the page table+index of the component of the address looks up the next level. The final level holds the physical address and various permission bits. Each unique address space would have a different set of these tables and a memory management unit (MMU) context switch on address space swap basically a swap of CR3 (in an x86-type architecture) or TTBR0 (on an ARM64-type architecture). FIG. 5 illustrates a way the fields can be parsed.

Figure 6B:
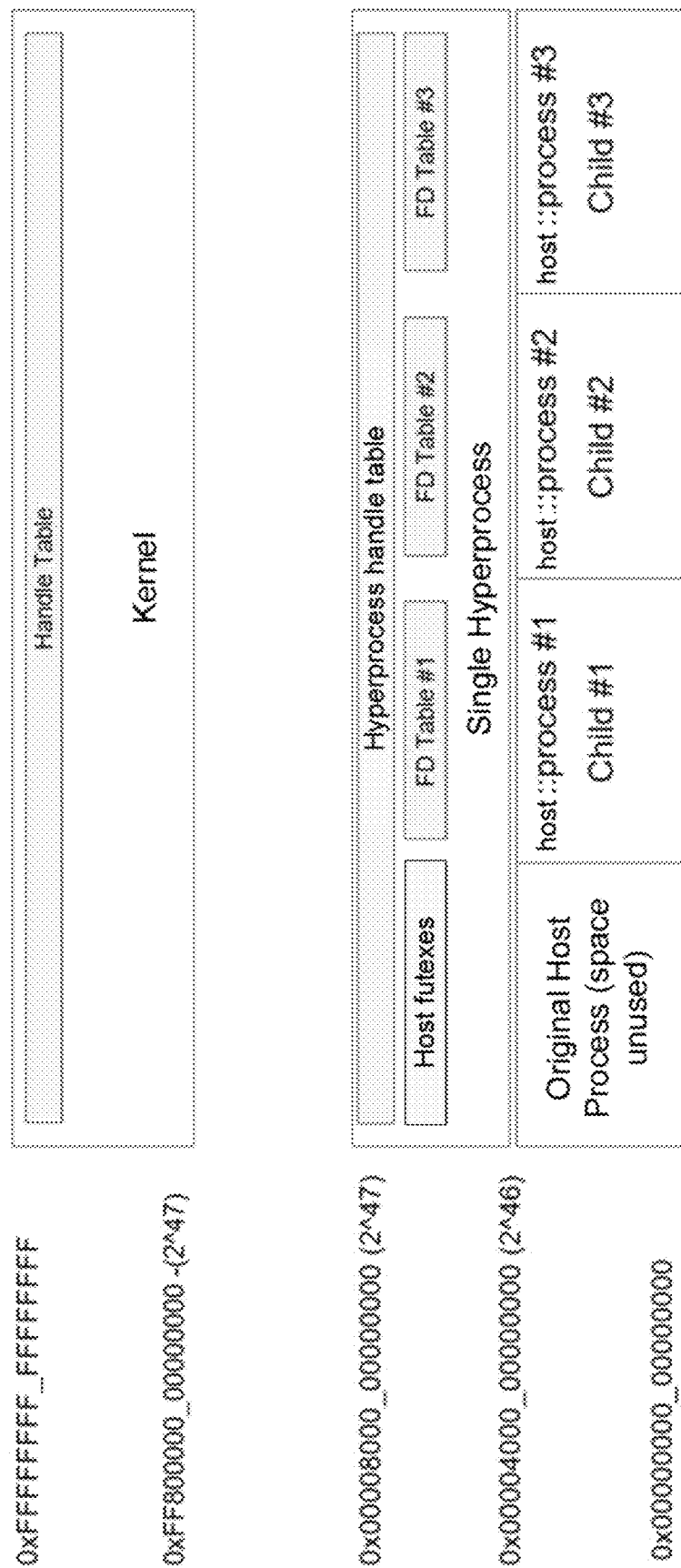

To enable an efficient sharing of a host "server" and child processes, if one were to pick a point in the address space to have higher level (L0) page tables point to shared lower level tables, the effect is for all of that region of the address space, the same mappings will appear in the same spot. For example, if one were to split an ARM64 address space exactly in half, instead of the address space getting a fill 48 bits range, each half would get 47 bits as follows:

[0x0000_0000_0000_0000 . . . 0x0000_7fff_ffff_ffff] =child process
[0x0000_8000_0000_0000 . . . 0x0000_ffff_ffff_ffff] =host server FIG. 6A illustrates an example 600 of an assigned address space, while FIG. 6B illustrates an example 620 of the assigned address space when in restricted mode. As shown, the "upper" address space (kernel space) includes a handle table and host kernel. A runner can be used to implement the restricted mode, including launching a hyperprocess and creating the hyperprocess handle table. In example 600, the "lower" address space (user space) includes a host process and child processes #1, #2 and #3 that are loaded into separate spaces in the memory address space for the restricted mode. In example 620, the user space is broken into two sections, which may have an even 50/50 split of the user space between unrestricted space and restricted space. Alternatively, the split can be made elsewhere so long as it occurs at a page table boundary. Thus, the system could do a 75/25 split, all the way down to a 1/511 split (where one side gets 512 GB (2^39 bits)) and the other side getting the rest.

The first section of unrestricted space (e.g., address space 2^46 to 2^47) includes the hyperprocess handle table and components associated with the hyperprocess, such as host futexes and file descriptor (FD) tables #1, #2 and #3 for each corresponding child process managed by the hyperprocess. Since the hyperprocess is mapped into multiple processes, it may have its own internal futexes in the shared portion of the address space. The second (restricted space) section (e.g., address space 0 to 2^46) includes areas assigned for specific guest child processes, and unused space that would otherwise be associated with the original host process.

In one example, a simple address mapping would be to cut a process in exactly half where each half is 2^46 bytes instead of 2^47 bytes (e.g., on an x86-type architecture) and the top half is for the host process and the bottom half is for a guest process(es). For this example, the way hardware page tables are configured would allow the system to directly share the L1-L3 page tables between processes without any additional overhead, aside from flushing a translation lookaside buffer (TLB), which is configured to store translations of virtual memory to physical addresses. TLB flushing would happen on context switches. However, other examples may employ more complex schemes involving mapping one VMAR into another as a more generic mechanism outside of restricted mode.

When the restricted mode is entered via a syscall, traps and exceptions return back to normal (unrestricted) mode via an in-process vector table. The kernel saves restricted state information (e.g., full integer register state) but 'forgets' normal state at the mode swap on transition back to normal mode. For instance, the system can exit from restricted mode implicitly via any syscall instruction, interrupt, or other direct trap. Some amount of register state is saved, the kernel context switches between the two parts of the address space, and the PC is set to the vector table. Variations can include having the user bind a virtual memory object (VMO) that holds the restricted state so that the host side code can simply check the state in a memory mapped buffer.

According to aspects of the technology, a thread for a given child process may access different memory regions depending on which process it is a member of, and which mode it is in. For instance, if a thread is in restricted mode, it can only access the restricted mode address space for its process, and the data associated with that process, but not anything in the hyperprocess address space. When transitioning to normal mode, then the thread is (logically) operating in the hyperprocess space, but is limited to things in that space corresponding to its specific child process. Thus, in normal mode, the thread could copy data into and out of its own child process. The thread may go up into kernel mode, and still have access to the corresponding hyperprocess and child process spaces. Logically, a thread may transition from restricted mode to unrestricted mode, such as when the restricted mode code performs an operation such as a syscall instruction. However, functionally, this may include the thread transitioning from restricted mode to kernel mode, checking corresponding state information associated with the operation, and then descend back down to unrestricted mode.

Kernel objects may be treated as follows for restricted mode. A process may have a 1:1 mapping with the address space, such as via an address space subdivision of 50/50 as noted above. The guest/child processes have an N:1 mapping with the handle table. Each thread of a given process has an N:1 mapping with that process, and an N:1 mapping with the address space. The address space may be configured to hold a tree of VMARs that carves up the address space. Here, VMAR tree leaves are virtual memory mappings. The address space has a 1:1 mapping with each architecture-specific memory management unit (ArchMmu), which holds the page table root for that address space and code to swap between. For instance, the code in the kernel may be structured to abstract architecture-specific routines via N architecture layers, to support different computer architecture types (e.g., ARM6(4, x86 or RISC-V).

The following is an example set of pseudocode for entering restricted mode:

```
user mode:
   enter_restricted( ) syscall from non-restricted mode to branch to restricted mode
kernel mode:
   at top of kernel stack push integer register state
   begin to decode sys call, check that it is coming from the VDSO at the right offset
   if sys call == enter_restricted:
      current_thread->in_restricted_mode = true
      memory management unit context switch to restricted part of address space
      load register state from curr_thread->restricted_state[ ]
      exit into restricted mode, resetting top of kernel stack on way out
```

The following is an example set of pseudocode for a system to exit from restricted mode:

```
user mode:
   syscall/svc using guest syscall arguments
kernel mode:
   at top of kernel stack push integer register state
   if current_thread->in_restricted_mode == false:
      continue syscall as usual
   else:
      current_thread->in_restricted_mode = false;
      memory management unit context switch to non restricted part of address space
      copy existing state on kernel stack into current_thread->restricted_state[ ]
      optionally save vector state
      exit syscall, with these properties:
         restore integer state at time of syscall
         PC set to current_thread->normal_vector
         kernel stack pointer set to top
```

The following is an example of an exception from restricted mode:

Kernel Mode:

at top of kernel stack push integer register state run normal exception processing If result is thread is continued (page faults that resolves):

Return from exception and continue

Any exception that results in a block or state change of the thread:

if current_thread→in_restricted_state:

block the thread using the unrestricted kernel exception mode handling logic

The following is an example of an interrupt from restricted mode:

Kernel Mode:

at top of kernel stack push integer register state run conventional interrupt processing i thread is marked for suspend/kill/etc.:

if currrent_thread→in_restricted_state:

follow the path for a trapped syscall instruction from restricted mode conventional exception handling if preempted at end of interrupt request:

if current_thread→in_restricted_state:

move saved state into current_thread→ restricted_state[ ]

block as per normal mode operation

In some situations, the system may need to force an abort from restricted mode if the system does not otherwise make a syscall or trap. One option to force an exit is via a standard thread suspend operation, and then deal with either the restricted mode trap or the suspended thread.

Shared and Restricted Regions

Without restricted mode, each process would have one address space (which may be referred to as a virtual memory address space, or "VmAspace"). VmAspace is the authority on what mappings exist and where. Each VmAspace has one root (e.g., "VmAddressRegion") that covers the entire address space of the process and contains a tree-like structure of subregions (more VmAddressRegion objects) and/or mappings ("VmMapping"). This VmAddressRegion may contain subregions and/or mappings (VmMapping), but has no parent. The subregions and VmMappings each have a pointer back to their containing VmAspace and their immediate parent. Each VmAspace has a lock that's used to protect the structure of the root VMAR and its children. This lock is held when mapping/unmapping VMOs, changing page access permissions, or handling page faults. Each VmAspace has an object (referred to as an "ArchVmAspace object"), which encapsulates the hardware page tables (PTs) for the VmAspace's root VMAR. The page tables act as a cache and can be rebuilt from the root VMARs structure.

In one scenario, each process can have reference pointers to two non-overlapping VmAspace objects, one for the shared region, and one for the restricted region. In a galaxy or other set of N processes, there would be exactly 1 shared VmAspace object and N private VmAspace objects. Each process can have two sets of page tables. One set of page tables would encompass both the shared and restricted region mappings. That is, everything accessible when executing in normal mode, so this may be referred to as the full set. The other set would then include just the restricted region mappings, and may be referred to as the restricted set.

In a galaxy of N processes, there would be N full page tables and N restricted page tables, each corresponding to a single process. Here, the system replicates page tables and thus there is no page table sharing between processes. For a given thread, only one set of page tables would be active at any given time. From a virtual machine perspective, entering restricted mode will perform a context switch from the full page tables to the restricted page tables. Likewise, exiting restricted mode is a context switch from restricted page tables back to the full page tables.

Giving each process its own page tables could make some operations computationally expensive. In particular, the cost of unmapping or changing the protection of pages would scale with the number of processes in the galaxy. For example, if the system needs to unmap something from the shared region and that shared region is in use by 500 processes, then the system would potentially need to modify 500 separate page table structures. In addition to certain operations scaling with the number of processes in a galaxy, the memory required to back the page tables of the shared region would also scale along this dimension. In an alternative, the system could remove the redundant page table entries and push the replication job down into the ArchVmAspace so that the system can share page tables for the shared region.

Exemplary Method of Operation

FIG. 7 illustrates a method 700 for implementing aspects of the technology. The method includes, at block 702, in an assigned address space, delineating a kernel space and a separate user space, the kernel space including a handle table and kernel of a host operating system. At block 704, in the user space, the method includes delineating a restricted space separate from an unrestricted space. The restricted space corresponds to a restricted mode and the unrestricted space corresponding to an unrestricted mode. At block 706, the method includes implementing a hyperprocess and creating a hyperprocess handle table in the unrestricted space. At block 708 the method includes loading a set of child processes into separate memory address spaces in the restricted space, wherein the set of child processes are associated with a guest operating system. As shown in block 710 the hyperprocess handle table is shared among the set of child processes and includes a set of file descriptor tables, each file descriptor table being associated with a specific child process of the set of child processes.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A computer-implemented method executable by one or more processors of a processing system, the method comprising:

in an assigned address space, delineating a kernel space and a separate user space, the kernel space including a handle table and kernel of a host operating system;

in the user space, delineating a restricted space separate from an unrestricted space, the restricted space corresponding to a restricted mode and the unrestricted space corresponding to an unrestricted mode, wherein the unrestricted mode allows access to both a private address space of a given address space and a shared address space of the given address space, and wherein the restricted mode allows access to the private address space and not the shared address space;

implementing a hyperprocess in the unrestricted space as a translation layer of the user space and creating a hyperprocess handle table in the unrestricted space; and loading a set of child processes into separate memory address spaces of the restricted space, wherein the set of child processes are associated with a guest operating system;

wherein the hyperprocess handle table is shared among the set of child processes and includes a set of file descriptor tables, each file descriptor table being associated with a specific child process of the set of child processes.

2. The method of claim 1, wherein the implementing is performed by a runner of the host operating system.

3. The method of claim 1, further comprising loading a host process into the restricted space in a location distinct from the memory address spaces of the child processes.

4. The method of claim 1, wherein delineating the restricted space separate from the unrestricted space includes splitting the user space into two partitions.

5. The method of claim 4, wherein the two partitions evenly split the user space.

6. The method of claim 4, wherein the two partitions are split along a page table boundary.

7. The method of claim 1, wherein the set of child processes has an N:1 mapping with hyperprocess handle table, and each thread of a given child process has an N:1 mapping with the given child process, and an N:1 mapping with the memory address spaces in the restricted space.

8. The method of claim 1, wherein the memory address spaces in the restricted space has a tree of virtual memory access regions associated with the set of child processes.

9. The method of claim 1, wherein upon entering the restricted mode via a system call, the method includes returning any traps and exceptions back to the unrestricted mode via an in-process vector table.

10. The method of claim 1, further comprising the kernel saving restricted state information upon transitioning to the unrestricted mode.

11. The method of claim 1, wherein a thread of a given child of the set of child processes is permitted to access different memory regions depending on which process it is a member of, and which mode it is operating in.

12. The method of claim 1, wherein implementing the hyperprocess and creating the hyperprocess handle table in the unrestricted space includes implementing a set of distinct hyperprocesses each having its own hyperprocess handle table, in which the set of child processes for a given one of the set of hyperprocesses does not interact with the set of child processes for any other of the set of hyperprocesses.

13. A processing system, comprising:

memory having a set of address spaces; and one or more processors operatively coupled to the memory, the one or more processors being configured to:

in an assigned address space, delineate a kernel space and a separate user space, the kernel space including a handle table and kernel of a host operating system;

in the user space, delineate a restricted space separate from an unrestricted space, the restricted space corresponding to a restricted mode and the unrestricted space corresponding to an unrestricted mode, wherein the unrestricted mode allows access to both a private address space of a given address space and a shared address space of the given address space, and wherein the restricted mode allows access to the private address space and not the shared address space;

implement a hyperprocess in the unrestricted space as a translation layer of the user space and create a hyperprocess handle table in the unrestricted space; and load a set of child processes into separate memory address spaces of the restricted space, wherein the set of child processes are associated with a guest operating system;

wherein the hyperprocess handle table is shared among the set of child processes and includes a set of file descriptor tables, each file descriptor table being associated with a specific child process of the set of child processes.

14. The processing system of claim 13, wherein the processing system is configured to load a host process into the restricted space in a location distinct from the memory address spaces of the child processes.

15. The processing system of claim 13, wherein delineation of the restricted space separate from the unrestricted space includes splitting the user space into two partitions.

16. The processing system of claim 13, wherein the set of child processes has an N:1 mapping with hyperprocess handle table, and each thread of a given child process has an N:1 mapping with the given child process, and an N:1 mapping with the memory address spaces in the restricted space.

17. The processing system of claim 13, wherein the memory address spaces in the restricted space has a tree of virtual memory access regions associated with the set of child processes.

18. The processing system of claim 13, wherein upon entering the restricted mode via a system call, the processing system supports returns of any traps and exceptions back to the unrestricted mode via an in-process vector table.

19. The processing system of claim 13, wherein a thread of a given child of the set of child processes is permitted to access different memory regions depending on which process it is a member of, and which mode it is operating in.

20. The processing system of claim 13, wherein implementation of the hyperprocess and creation of the hyperprocess handle table in the unrestricted space includes implementing a set of distinct hyperprocesses each having its own hyperprocess handle table, in which the set of child processes for a given one of the set of hyperprocesses does not interact with the set of child processes for any other of the set of hyperprocesses.

* * * * *